US011487595B2

(12) United States Patent
Take et al.

(10) Patent No.: US 11,487,595 B2
(45) Date of Patent: Nov. 1, 2022

(54) API ADAPTER CREATION DEVICE, API ADAPTER CREATION METHOD, AND API ADAPTER CREATION PROGRAM

(71) Applicant: Nippon Telegraph and Telephone Corporation, Tokyo (JP)

(72) Inventors: Naoki Take, Tokyo (JP); Kensuke Takahashi, Tokyo (JP); Tomoki Ikegaya, Tokyo (JP); Nobuo Onai, Tokyo (JP); Miwaka Otani, Tokyo (JP); Hiroshi Kato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 85 days.

(21) Appl. No.: 17/264,589

(22) PCT Filed: Jul. 12, 2019

(86) PCT No.: PCT/JP2019/027797
§ 371 (c)(1),
(2) Date: Jan. 29, 2021

(87) PCT Pub. No.: WO2020/026778
PCT Pub. Date: Feb. 6, 2020

(65) Prior Publication Data
US 2021/0334149 A1    Oct. 28, 2021

(30) Foreign Application Priority Data
Aug. 2, 2018    (JP) .............................. JP2018-146236

(51) Int. Cl.
*G06F 9/54*    (2006.01)
*G06F 8/30*    (2018.01)

(52) U.S. Cl.
CPC .............. *G06F 9/541* (2013.01); *G06F 8/311* (2013.01)

(58) Field of Classification Search
CPC ................................. G06F 9/541; G06F 8/311
See application file for complete search history.

(56) References Cited

U.S. PATENT DOCUMENTS

| 2011/0088011 A1* | 4/2011 | Ouali ...................... G06F 11/36 717/105 |
| 2014/0006239 A1* | 1/2014 | Dieterich ............. G06Q 10/067 705/35 |

(Continued)

OTHER PUBLICATIONS

Take et al., "Applicability of Swagger Codegen to API Adaptor Development," Lecture at the IEICE General Conference, Mar. 20, 2018, 3 pages (with English Translation).

(Continued)

*Primary Examiner* — S. Sough
*Assistant Examiner* — Carina Yun
(74) *Attorney, Agent, or Firm* — Fish & Richardson P.C.

(57) ABSTRACT

An Application Program Interface (API) adapter creation apparatus is configured to accept, from a developing engineer, a setting of an execution order of a wholesale service API invoked by internal processing of an adapter API provided by an API adapter, a setting of a request parameter of the adapter API serving as an acquisition source of a request parameter of the wholesale service API, and a setting of a response parameter of the adapter API serving as a reflection destination of a response parameter of the wholesale service API. The API adapter creation apparatus generates a source code based on the accepted settings.

12 Claims, 14 Drawing Sheets

(56) References Cited

U.S. PATENT DOCUMENTS

2014/0006257 A1\* 1/2014 Der Emde ............. G06Q 30/06
705/39
2020/0387415 A1\* 12/2020 Take ...................... G06Q 50/10

OTHER PUBLICATIONS

Take et al., "Study on Supporting Web API Adaptor Development," Institute of Electronics, Information and Communication Engineers, Oct. 19, 2017, 3 pages (with English Translation).

\* cited by examiner

| | 231 | 232 | 233 | 234 | 230 235 | 236 | |
|---|---|---|---|---|---|---|---|
| | API | TYPE | EXECUTION ORDER | PROCESSING TYPE | PROCESSING | ADDITIONAL INFORMATION | |
| | XXX | A | 1 | API EXECUTION | postAuth | — | 241 |
| | XXX | A | 2 | API EXECUTION | postNetwork | — | 242 |
| | ... | ... | ... | ... | ... | ... | |
| | YYY | A | 1 | API EXECUTION | postAuth | — | 243 |
| | YYY | A | 2 | CONTROL | for | productOrder.characteristic.network | 244 |
| | YYY | A | 3 | CONTROL | if | productOrder.characteristic.network.enable == true | 245 |
| | YYY | A | 4 | API EXECUTION | postNetwork | — | 246 |
| | YYY | A | 5 | CONTROL | end if | — | 247 |
| | YYY | A | 6 | CONTROL | end for | — | 248 |
| | ... | ... | ... | ... | ... | ... | |

Fig. 6

| | 251 | 252 | 253 | 254 | 250 255 | 256 | 257 | |
|---|---|---|---|---|---|---|---|---|
| | API | TYPE | PROCESSING | PARAMETER TYPE | OBJECT | PARAMETER | INPUT SOURCE/ REFLECTION DESTINATION | |
| | YYY | A | postAuth,1 | REQUEST | AuthRequest | email | accountInfo.email | 261 |
| | ... | ... | ... | ... | ... | ... | ... | |
| | YYY | A | postNetwork,4 | REQUEST | Network | name | productOrder.characteristic.network.name | 262 |
| | ... | ... | ... | ... | ... | ... | ... | |
| | YYY | A | postAuth,1 | RESPONSE | AuthResponse | apiToken | internalData.apiToken | 263 |
| | ... | ... | ... | ... | ... | ... | ... | |

Fig. 7

| ADAPTER | TYPE | EXECUTION ORDER | TYPE | PROCESSING | ADDITIONAL INFORMATION | |
|---|---|---|---|---|---|---|
| YYY | A | 1 | API EXECUTION | postAuth | — | 271 |
| YYY | A | 2 | CONTROL | if | productOrder.characteristic.network.enable == true | 272 |
| YYY | A | 3 | API EXECUTION | postNetwork | — | 273 |
| YYY | A | 4 | CONTROL | end if | — | 274 |

```
1  class AddYYYProcess extends YYYProcess{
2
3    public interactWithPartner() {
4
5      AuthRequest authRequest = new AuthRequest();
6      authRequest.email = accountInfo.email;
7      authRequest.password = accountInfo.password;
8
9      HTTPResponse res = postAuth.execute(authRequest);
10
11     AuthResponse authResponse = res.body;
12     internalData.apiToken = authResponse.apiToken;
13
14     for (int i=0; i < productOrder.characteristic.network.length; i++) {
15       if (productOrder.characteristic.network[i].enable == true) {
16         Network network = new Network();
17         network.name = productOrder.characteristic.network[i].name;
18         network.description
19             = productOrder.characteristic.network[i].description;
20
21         HTTPResponse res = postNetwork.execute(network);
22
23         NetworkResponse networkResponse = res.body;
24         product.networkResponse[i] = networkResponse;
25       }
26     }
27   }
28 }
```

API ADAPTER CREATION DEVICE, API ADAPTER CREATION METHOD, AND API ADAPTER CREATION PROGRAM

CROSS-REFERENCE TO RELATED APPLICATIONS

This application is a National Stage application under 35 U.S.C. § 371 of International Application No. PCT/JP2019/027797, having an International Filing Date of Jul. 12, 2019, which claims priority to Japanese Application Serial No. 2018-146236, filed on Aug. 2, 2018. The disclosure of the prior application is considered part of the disclosure of this application, and is incorporated in its entirety into this application.

TECHNICAL FIELD

The present invention relates to an API adapter creation apparatus, an API adapter creation method, and an API adapter creation program that enable an API adapter provided in a multi-service coordination execution apparatus to be efficiently created.

BACKGROUND ART

In recent years, a communication service using a Business to Business to X (B2B2X) model for a service provider to create a new digital service, in which the digital service is provided to end users using digital services (wholesale services) of other providers, rather than building the entire service using its own facilities has become popular.

With the spread of services using the B2B2X model, the importance of a multi-service coordination execution apparatus for building and operating a coordinated service that is created by combining a plurality of wholesale services has increased. Due to the frequent introduction of new wholesale services and changes in existing service specifications, service providers of coordinated services are required to catch up with new wholesale services and changes in existing service specifications at low costs in a short period of time.

Service providers provide services as a REpresentational State Transfer Application Program Interface (REST API) (hereinafter also simply referred to as an API) on the HyperText Transfer Protocol (HTTP). In addition, service providers also define and publish API specifications such as the names of APIs, the Uniform Resource Locators (URL) of access destinations, HTTP methods, and parameters.

Service providers that provide coordinated services refer to the API specifications of the wholesale services to design a method of combining the wholesale services and develop equipment (multi-service coordination execution apparatus) to build and provide such coordinated services. There are techniques described in Non Patent Literature 1 and Non Patent Literature 2 as architectures for a multi-service coordination execution apparatus that can easily cope with the new wholesale services and change in existing service specifications. In addition, Non Patent Literature 1 and Non Patent Literature 2 propose API adapters that can easily support new wholesale services or changes in specifications by absorbing difference in different wholesale service specifications.

CITATION LIST

Non Patent Literature

Non Patent Literature 1: "A Study on Easy Development of Web API Adapter," Naoki Take and 5 others, Steering Committee on Network Software, the Institute of Electronics, Information, and Communication Engineers, Oct. 19, 2017

Non Patent Literature 2: "Applicability of Swagger Codegen in Development of API," General Conference Lecture of the Institute of Electronics, Information, and Communication Engineers, B-14-13, the Institute of Electronics, Information, and Communication Engineers, Mar. 20 to 23, 2018

SUMMARY OF THE INVENTION

Technical Problem

Non Patent Literature 1 and Non Patent Literature 2 describe that API adapters can be easily developed by using commercially available libraries for some constituent components (modules) of the API adapter, making the components into shared libraries, and automatically generating source codes based on the specifications of wholesale service APIs. However, because the API adapters still have modules that are required to be manually designed and implemented, easier development thereof has been demanded.

The present invention has been made in view of such a background, and an objective of the present invention is to provide an API adapter creation apparatus, an API adapter creation method, and an API adapter creation program that enable an API adapter for wholesale services provided in a multi-service coordination execution apparatus to be efficiently created.

Means for Solving the Problem

In order to solve the above-described problems, the invention described in claim 1 is an Application Program Interface (API) adapter creation apparatus configured to create an adapter API provided by an API adapter of a plurality of wholesale services, the adapter provided in a multi-service coordination execution apparatus configured to construct a coordinated service in which the wholesale services are combined, the API adapter creation apparatus including an API execution order setting unit configured to accept a setting of an execution order of a wholesale service API indicating the API of the wholesale service invoked by internal processing of the adapter API; an API request parameter acquisition source setting unit configured to accept a setting of a request parameter of the adapter API serving as an acquisition source of a request parameter of the wholesale service API; an API response parameter reflection destination setting unit configured to accept a setting of a response parameter of the adapter API serving as a reflection destination of a response parameter of the wholesale service API; and a source code generation unit configured to generate a source code of the adapter API based on the setting of the execution order, the setting of the acquisition source, and the setting of the reflection destination.

In addition, the invention according to claim 5 is an API adapter creation method of an API adapter creation apparatus configured to create an adapter API provided by an API adapter of a plurality of wholesale services, the API adapter provided in a multi-service coordination execution apparatus configured to construct a coordinated service in which the wholesale services are combined, the API adapter creation method including accepting a setting of an execution order of a wholesale service API indicating the API of the wholesale service invoked by internal processing of the adapter API; accepting a setting of a request parameter of the adapter API serving as an acquisition source of a request parameter of the wholesale service API; accepting a setting of a response parameter of the adapter API serving as a reflection destination of a response parameter of the wholesale service API; and generating a source code of the adapter API based on the setting of the execution order, the setting of the acquisition source, and the setting of the reflection destination.

With this configuration, the API adapter creation apparatus can generate a source code including invocation of a wholesale service API in accordance with an execution order defined by a developing engineer of the API adapter, acquisition of a request parameter of the wholesale service API from request parameters of an adapter API, and reflection of a response parameter of the wholesale service in a response parameter of the adapter API. Thus, a developing engineer does not need to describe the source code and thus can focus on study of the logic. As a result, the development period for the API adapter is reduced, enabling new wholesale services or changes in specifications to be dealt with in a short period of time.

The invention according to claim 2 is the API adapter creation apparatus according to claim 1, further including an API execution condition setting unit configured to accept a setting of an execution condition for execution of the wholesale service API, in which the source code generation unit generates a source code of the adapter API including content of the setting of the execution condition.

With this configuration, the API adapter apparatus can generate a source code that includes conditional invocation of the wholesale service API.

The invention according to claim 3 is the API adapter creation apparatus according to claim 1, further including an API iteration condition setting unit configured to accept a setting of an iteration condition for iterative execution of the wholesale service API, in which the source code generation unit generates a source code of the adapter API including content of the setting of the iteration condition.

With this configuration, the API adapter apparatus can generate a source code that includes iterative invocation of the wholesale service API.

The invention according to claim 4 is the API adapter creation apparatus according to any one of claims 1 to 3, further including an API request/response parameter design support unit configured to set, when specification of a request parameter of the wholesale service API is accepted, a request parameter of the adapter API having an identical name to that of the request parameter as an acquisition source, and to set, when specification of a response parameter of the wholesale service API is accepted, a response parameter of the adapter API having an identical name to that of the response parameter as a reflection destination, in which the source code generation unit generates a source code of the adapter API that includes content of the setting of the acquisition source and the reflection destination set by the API request/response parameter design support unit.

With this configuration, a developing engineer can set a request parameter and a response parameter with fewer operations than when the API adapter apparatus of claim 1 is used, making the development of the API adapter more efficient.

The invention according to claim 6 is an API adapter creation program for causing a computer to function as the API adapter creation apparatus according to any one of claims 1 to 4.

With this configuration, the API adapter apparatus according to any one of claims 1 to 4 can be realized by using a general computer.

EFFECTS OF THE INVENTION

According to the present invention, it is possible to provide an API adapter creation apparatus, an API adapter creation method, and an API adapter creation program that enable an API adapter for a wholesale service provided in a multi-service coordination execution apparatus to be efficiently created.

BRIEF DESCRIPTION OF DRAWINGS

FIG. 6 is a diagram illustrating a data configuration of an API execution order database according to the present embodiment.

FIG. 7 is a diagram illustrating a data configuration of an API parameter database according to the present embodiment.

FIG. 21 is a source code generated by the source code generation unit according to the present embodiment.

DESCRIPTION OF EMBODIMENTS

Hereinafter, an overall configuration of a multi-service coordination execution apparatus with an API adapter, a configuration of the API adapter, and a problem in developing the API adapter will be described, and then an API adapter creation apparatus (see FIG. 4, which will be described below) in a mode (embodiment) for implementing the present invention will be described.

Configuration of Multi-Service Coordination Execution Apparatus

Figure 1:
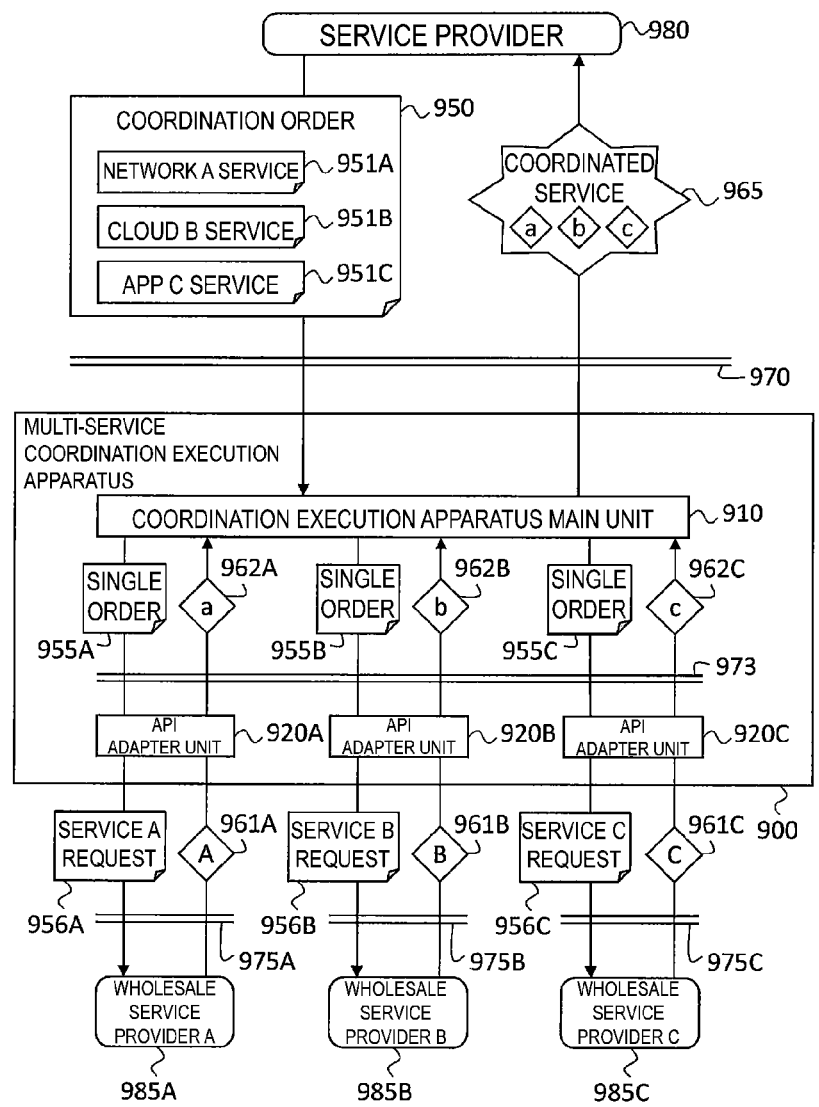
FIG. 1 is a diagram illustrating a configuration of a network system including a multi-service coordination execution apparatuses according to the present embodiment.

FIG. 1 is a diagram illustrating a configuration of a network system including a multi-service coordination execution apparatus 900 according to the present embodiment. The multi-service coordination execution apparatus 900 includes a coordination execution apparatus main unit 910 and API adapter units 920A to 920C.

A service provider 980 issues a coordination order 950 to the multi-service coordination execution apparatus 900 and receives a coordinated service 965 via a multi-service collaboration API 970. The coordination order 950 is a message to request the coordinated service 965 in which a network A service 951A, a cloud B service 951B, and an application C service (which is described as an app C service in FIG. 1) 951C are coordinated.

The coordination execution apparatus main unit 910 receives the services included in the received coordination order 950 from the wholesale service provider, coordinates the services, and provides the services to the service provider 980 as the coordinated service 965. With reference to a catalog (a setting file), which is not illustrated, the coordination execution apparatus main unit 910 generates a single order 955A corresponding to the network A service 951A, a single order 955B corresponding to the cloud B service 951B, and a single order 955C corresponding to the application C service 951C, the services included in the coordination order 950.

The coordination execution apparatus main unit 910 requests a wholesale service via the coordination execution apparatus main unit API 973 using the single orders 955A to 955C as parameters. The coordination execution apparatus main unit 910 receives services 962A to 962C and coordinates the services to generate the coordinated service 965 and provide the coordinated service to the service provider 980.

The API adapter unit 920A accepts the single order 955A, transmits a service A request 956A to a wholesale service provider A 985A via a wholesale service API 975A, receives a service A 961A, and provides a service 962A to the coordination execution apparatus main unit 910.

The API adapter unit 920B accepts the single order 955B, transmits a service B request 956B to a wholesale service provider B 985B via a wholesale service API 975B, receives a service B 961B, and provides a service 962B to the coordination execution apparatus main unit 910.

The API adapter unit 920C accepts the single order 955C, transmits a service C request 956C to a wholesale service provider C 985C via a wholesale service API 975C, receives a service C 961C, and provides a service 962C to the coordination execution apparatus main unit 910.

The wholesale service APIs 975A to 975C are APIs that are provided independently by the wholesale service provider A 985A, the wholesale service provider B 985B, and the wholesale service provider C 985C. The API adapter units 920A to 920C absorb differences of the wholesale service APIs 975A to 975C and provide a common coordination execution apparatus main unit API 973 to the coordination execution apparatus main unit 910.

Thus, if a new wholesale service emerges and a wholesale service API of the service is provided, a corresponding API adapter unit is developed, and if the wholesale service is registered in a catalog, the multi-service coordination execution apparatus 900 can provide a coordinated service including the new wholesale service, without changing the coordination execution apparatus main unit 910. Thus, the time and cost required for the new wholesale service depend on the time and cost required for development of the API adapter units 920A to 920C, and thus easy development is demanded.

Configuration of API Adapter Unit

Figure 2:
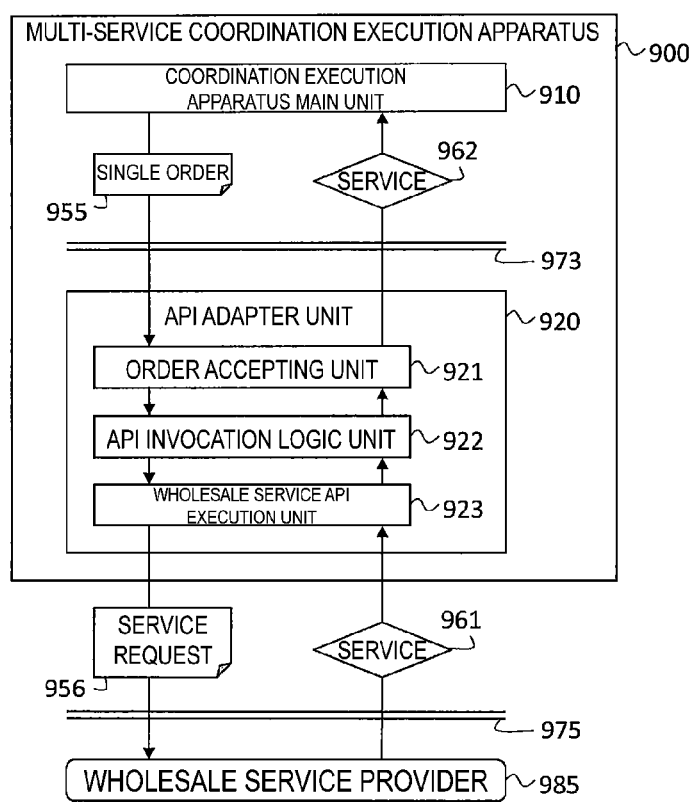
FIG. 2 is a diagram illustrating a configuration of an API adapter unit according to the present embodiment.

FIG. 2 is a diagram illustrating a configuration of an API adapter unit 920 according to the present embodiment. The API adapter unit 920 includes an order accepting unit 921, an API invocation logic unit 922, and a wholesale service API execution unit 923.

The order accepting unit 921 accepts a single order 955 from the coordination execution apparatus main unit 910 and acquires the content of the order. In addition, the order accepting unit 921 processes a response with respect to the coordination execution apparatus main unit 910.

The API invocation logic unit 922 invokes (executes) an individual services provided by the wholesale service provider 985 via the API to obtain the service requested in the single order 955. At this time, the API invocation logic unit 922 generates a request parameter for the individual service in an execution order of individual services provided by the wholesale service provider 985 and invokes the service via the API to process a response parameter. The wholesale service API execution unit 923 assembles HTTP requests in response to the invocation of the API invocation logic unit 922 and transmits the requests to the wholesale service provider 985, receives a response, and outputs it to the API invocation logic unit 922.

The order accepting unit 921 enables efficient development by creating a shared library. Moreover, the wholesale service API execution unit 923 can perform efficient development by using an automated generation tool for source codes based on API specifications for the individual services (see Non Patent Literature 2). However, manual design and implementation of the API invocation logic unit 922 are required, which incur more time and cost required for the development.

In the present invention, the source codes of the API invocation logic unit 922 are generated by manually setting only minimum items in the design of the API invocation logic unit 922, which enables the API adapter unit 920 to be efficiently developed.

Note that, in the following description, regarding a wholesale service and a wholesale service API as the same, requesting (invoking) a wholesale service via a wholesale service API will also be described as invoking (executing) a wholesale service API, or the like.

Development Procedure of API Invocation Logic Unit

Figure 3:
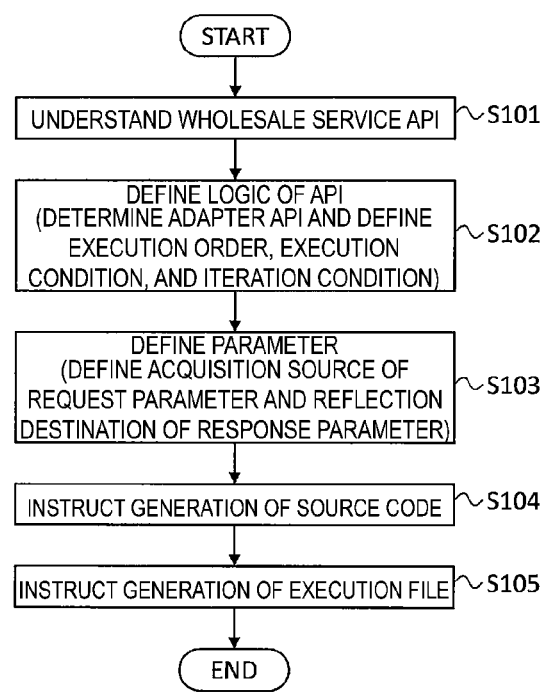
FIG. 3 is a flowchart for explaining a development procedure of an API invocation logic unit according to the present embodiment.

FIG. 3 is a flowchart for explaining a development procedure of the API invocation logic unit 922 according to the present embodiment. Referring to FIGS. 3 and 2, a development procedure of the API invocation logic unit 922 performed by a developing engineer using an API adapter creation apparatus (see FIG. 4, which will be described later) will be described.

In step S101, the developing engineer understands an API of a wholesale service. Specifically, the developing engineer refers to the specifications of the API provided by the wholesale service provider 985 or uses an API test tool commercially available in the industry to understand the wholesale service API while checking the specifications (operation verification of the API).

In step S102, the developing engineer defines logic of the API (which is an API provided as the coordination execution apparatus main unit API 973, an API supported by the API adapter unit 920, and an API to be developed, which is also referred to as an adapter API). Specifically, the developing engineer determines an adapter API and defines (sets) an execution order (see FIG. 8, which will be described below), execution conditions (see FIGS. 14 and 15 which will be described below), and iteration conditions (see FIGS. 17 and 18, which will be described below) of individual services of wholesale services (wholesale service API) required to cause the adapter API to function. Note that, regarding the adapter API and an internal process thereof as the same in the following description, the adapter API will also be described as invoking (executing) a wholesale service (wholesale service API).

In step S103, the developing engineer defines parameters. Specifically, the developing engineer defines a request parameter (see FIG. 9, which will be described below) included in the single order 955 which is an acquisition source of the request parameter of the individual services, and a response parameter (see FIG. 10, which will be described below) of the service 962 which is a reflection destination of the response parameter of the individual services.

In step S104, the developing engineer instructs the API adapter creation apparatus to generate source codes of the API invocation logic unit 922 (see FIG. 21 which will be described below).

In step S105, the developing engineer instructs the API adapter creation apparatus to generate execution files of the API adapter unit 920 including the order accepting unit 921 and the wholesale service API execution unit 923.

It has been described that the developing engineer performs steps S101 to S105 sequentially. However, the developing engineer develops the adapter API (the API adapter unit 920) while ascertaining insufficient understanding of the wholesale service API in the middle of step S103 and returning to steps S101 and S102 or finding an operation defect in execution of the execution files and returning to steps S102 and S103.

Overall Configuration of API Adapter Apparatus

Figure 4:
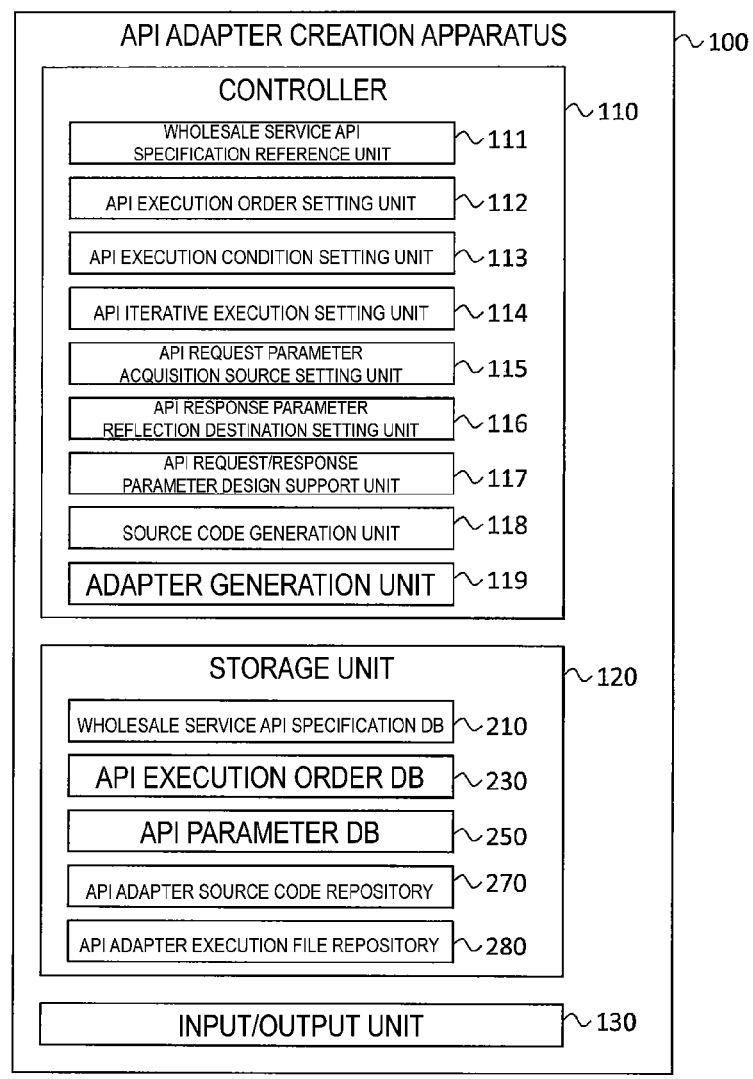
FIG. 4 is a diagram illustrating an overall configuration of an API adapter creation apparatus according to the present embodiment.

FIG. 4 is a diagram illustrating an overall configuration of the API adapter creation apparatus 100 according to the present embodiment. Referring to FIG. 4, a configuration of the API adapter creation apparatus 100 that a developing engineer uses to develop the API adapter described in steps S102 to S105 of FIG. 3 will be described.

The API adapter creation apparatus 100 includes a controller 110, a storage unit 120, and an input/output unit 130. The input/output unit 130 is configured with an input device (not illustrated) such as a keyboard or a mouse and an output device (not illustrated) such as a display, and accepts and displays logic and parameters of the adapter API defined by the developing engineer.

The controller 110 is configured with a central processing unit (CPU) and includes a wholesale service API specification reference unit 111, an API execution order setting unit 112, an API execution condition setting unit 113, an API iterative execution setting unit 114, an API request parameter acquisition source setting unit 115, an API response parameter reflection destination setting unit 116, an API request/response parameter design support unit 117, a source code generation unit 118, and an adapter generation unit 119.

The wholesale service API specification reference unit 111 reads the API specifications described in the standard format of the wholesale service and stores them in a wholesale service API specification database 210 of the storage unit 120 (described as a wholesale service API specification database (DB) in FIG. 4, and see FIG. 5 which will be described below). Also, the wholesale service API specification reference unit 111 displays the name and a parameter of the read API included in the API specifications of the wholesale service on a display.

Wholesale Service API Specification Database

Figure 5:
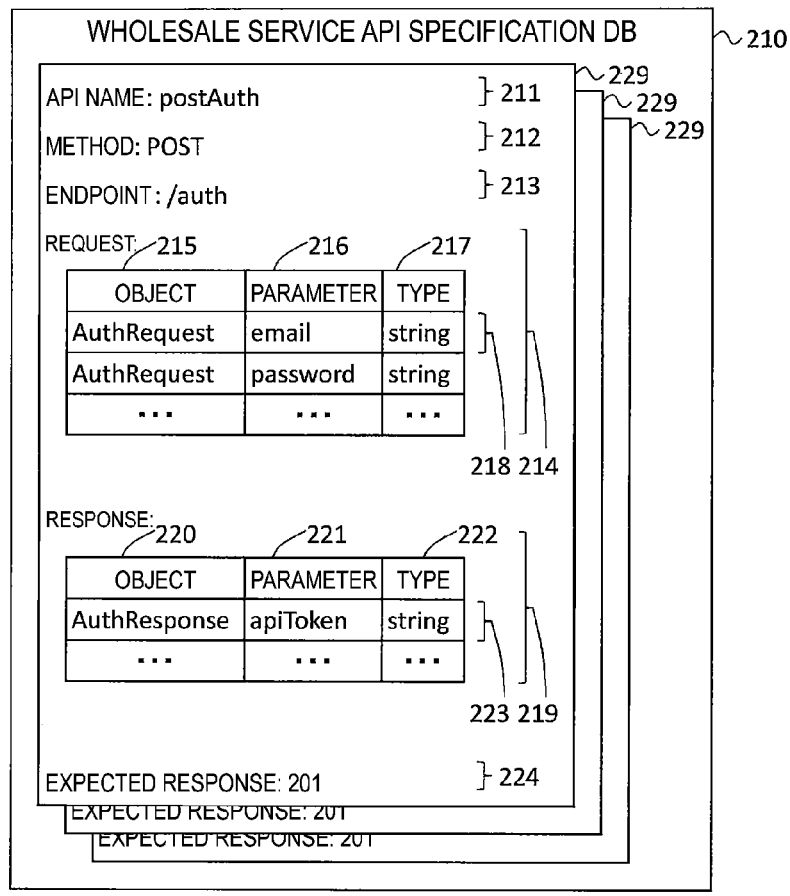
FIG. 5 is a diagram illustrating a data configuration of a wholesale service API specification database according to the present embodiment.

FIG. 5 is a diagram illustrating a data configuration of the wholesale service API specification database 210 according to the present embodiment. The wholesale service API specification database 210 is configured with API specifications 229 for individual services provided by the wholesale service provider 985 (see FIG. 2). Each of the API specifications 229 includes descriptions of an API name 211, a method 212, an endpoint 213, a request parameter 214, a response parameter 219, and an expected response 224.

The API name 211 is the name of an API. The method 212 is an HTTP method used when invoking an API, and includes GET, POST, or the like. The endpoint 213 is the address used to invoke an API.

The request parameter 214 is, for example, tabular data, in which one row (record) represents one request parameter and includes columns (attributes) of an object 215, a parameter 216, and a type 217. The object 215 is the name of an object including a parameter indicated by a record. The parameter 216 is the name of a parameter. The type 217 is the type of a parameter. A record 218 represents a parameter "email" that is included in an object "AuthRequest" having a type of "string."

The response parameter 219 is, for example, tabular data, in which one record represents one response parameter and includes attributes of an object 220, a parameter 221, and a type 222. The object 220, the parameter 221, and the type 222 have definitions similar to those of the object 215, the parameter 216, and the type 217, respectively. A record 223 represents a parameter "apiToken" that is included in an object "AuthResponse" having a type of "string."

The expected response 224 indicates an HTTP status code at the time of a normal response after invoking the API.

Controller of API Adapter Creation Apparatus (Logic Setting)

Returning to FIG. 4, the API execution order setting unit 112 sets an order of wholesale service APIs to be invoked by the adapter API. Specifically, the API execution order setting unit 112 reflects an order of invoking (order of executing) the wholesale service APIs (see FIG. 8 which will be described below) defined by the developing engineer in an API execution order database 230 (see FIG. 6), which will be described below.

The API execution condition setting unit 113 sets an execution condition for the wholesale service APIs to be invoked by the adapter API. Specifically, the API execution condition setting unit 113 reflects a wholesale service API (see FIG. 14, which will be described below) to be invoked under a condition defined by the developing engineer or its execution condition (an invocation condition, see FIG. 15, which will be described below) in the API execution order database 230.

The API iterative execution setting unit 114 sets a wholesale service API to be repeatedly invoked by the adapter API. Specifically, the API iterative execution setting unit 114 reflects a wholesale service API (see FIG. 17 which will be described below) to be repeatedly invoked or an iteration condition (see FIG. 18, which will be described below) defined by the developing engineer in the API execution order database 230, which will be described below.

API Execution Order Database

FIG. 6 is a diagram illustrating a data configuration of the API execution order database 230 according to the present embodiment. The API execution order database 230 is, for example, tabular data, in which one row (record) represents processing performed by one adapter API. Each record includes columns (attributes) for an API 231, a type 232, an execution order 233, a processing type 234, processing 235, and additional information 236.

The API 231 is the name of the adapter API. The type 232 is a type of the adapter API, in which "A" indicates new, "M" indicates modification, and "D" indicates deletion. One adapter API is identified by a combination of the API 231 with the type 232.

The execution order 233 indicates an order of execution in one adapter API. The processing type 234 indicates a type of processing indicated by the record, including "API execution" indicating invocation of a wholesale service API and "control" indicating conditional execution or iterative execution.

The processing 235 indicates content of processing. If the processing type 234 is "API execution," the processing 235 represents the API name of the wholesale service to be invoked (see the API name 211 in FIG. 5). If the processing type 234 is "control," the processing 235 represents "if" indicating the start of conditional execution and an execution condition, "end if" indicating the end of the conditional execution, "for" indicating the start of iterative execution and an iteration condition, or "end for" indicating the end of the iterative execution.

The additional information 236 is an execution condition or an iteration condition. Records 241 and 242 indicate that an adapter API named "XXX" in the type 232 of "A" (new) invokes (executes) a wholesale service API "postAuth" first and then invokes "postNetwork."

Records 243 to 248 indicate that an adapter API named "YYY" in the type 232 of "A" invokes "postAuth" first (see record 243), and subsequently performs iterative processing (see a record 244). A condition for the iterative processing is "productOrder.characteristic.network" indicated in the additional information 236 of the record 244. In particular, "productOrder.characteristic.network" is a variable indicating the sequence, and repeats processing for each element of the sequence. The content of the iterative processing is processing performed up to "end for" (see a record 248) corresponding to "for" that is processing 235 of the record 244 and the processing indicated by records 245 to 247 is repeated.

The processing of the records 245 to 247 will be described below. The record 245 indicates conditional execution, and the condition is "productOrder.characteristic.network.enable=true" indicated in the addition information 236. If a value of the parameter indicated by "productOrder.characteristic.network.enable" is "true," the processing is performed. The content of the processing to be performed is processing performed up to "end if" (see the record 247) corresponding to "if" which is the processing 235 of the record 245, and is processing to invoke the wholesale service API "postNetwork" indicated by the record 246.

Controller of API Adapter Creation Apparatus (Parameter Setting)

Returning to FIG. 4, the API request parameter acquisition source setting unit 115 sets a request parameter for an adapter API, which is an acquisition source of the request parameter of a wholesale service API to be invoked. Specifically, the API request parameter acquisition source setting unit 115 reflects the request parameter of adapter API serving as an acquisition source of the request parameter of the wholesale service API (see FIG. 9) defined by a developing engineer in the API parameter database 250 (see FIG. 7) which will be described below.

The API response parameter reflection destination setting unit 116 sets a response parameter of the adapter API that will serve as a reflection destination of the response parameter of the wholesale service API to be invoked. Specifically, the API response parameter reflection destination setting unit 116 reflects the response parameter of the adapter API serving as a reflection destination of the response parameter of the wholesale service API (see FIG. 10) defined by the developing engineer in the API parameter database 250 (see FIG. 7) which will be described below.

The API request/response parameter design support unit 117 sets an acquisition source of the request parameter and a reflection destination of the response parameter of the wholesale service API, without being defined by the developing engineer. Specifically, based on the object 215, the parameter 216, and the type 217 of the request parameter 214 (see FIG. 5) of the wholesale service API, the API request/response parameter design support unit 117 defines a request parameter for the adapter API serving as an acquisition source to reflect it in the API parameter database 250 (see FIG. 7) which will be described below. In addition, the API request/response parameter design support unit 117 defines a response parameter of the adapter API serving as a reflection destination to reflect it in the API parameter database 250 (see FIG. 7) which will be described below, based on the object 220, the parameter 221, and the type 222 of the response parameter 219 (see FIG. 5) of the wholesale service API.

API Parameter Database

FIG. 7 is a diagram illustrating a data configuration of the API parameter database 250 according to the present embodiment. The API parameter database is, for example, tabular data in which one row (record) indicates parameters of the wholesale service API and includes columns (attributes) of API 251, type 252, processing 253, parameter type 254, object 255, parameter 256, and input source/reflection destination 257.

The API 251 and the type 252 are similar to the API 231 and the type 232 of the API execution order database 230 (see FIG. 6), respectively, and the parameters of the wholesale service API indicated by the records indicate which adapter API that is invoking. The processing 253 corresponds to the processing 235 and the execution order 233 of the API execution order database 230, and the parameters indicated by the record indicate parameters for invocation of a wholesale service API. Because there is a case in which an adapter API invokes the same wholesale service API multiple times, a wholesale service API that is invoked in combination of the processing 235 with the execution order 233 is specified.

The parameter type 254 is a type of a parameter, which is "request" or "response." The object 255 corresponds to the object 215 of the request parameter 214 or the object 220 of the response parameter 219 illustrated in FIG. 5. In addition, the parameter 256 corresponds to the parameter 216 of the request parameter 214 or the parameter 221 of the response parameter 219. The object 255 and the parameter 256 can allow which parameter of the wholesale service API shown in the processing 253 to be specified.

The input source/reflection destination 257 is a parameter for an adapter API serving as an input source or a reflection destination.

Record 261 indicates that, in invocation of the wholesale service API of "postAuth" having an execution order of "1" of the adapter API named "YYY" of "A" (see the record 243 of FIG. 6), an input source of the parameter 256 "email" having the object 255 of the request parameter "AuthRequest" is "accountInfo.email" of the adapter API.

Record 262 indicates that, in invocation of the wholesale service API of "postNetwork" having an execution order of "4" (see the record 246), an input source of the parameter 256 "name" having the object 255 of the request parameter is "productOrder.characteristic.network.name" of the adapter API.

Record 263 indicates that, in invocation of the wholesale service API of "postAuth" having an execution order of "1" (see the record 243 of FIG. 6), a reflection destination with the parameter 256 "apiToken" having the object 255 of the response parameter "AuthResponse" is "internalData.apiToken" of the adapter API.

Controller of API Adapter Creation Apparatus (Other)

Returning to FIG. 4, the source code generation unit 118 generates a source code (see FIG. 21, which will be described below) of the API invocation logic unit 922 based on information stored in the API execution order database 230 and the API parameter database 250. This source code generation process will be described with reference to FIGS. 19 and 20, which will be described below. The adapter generation unit 119 compiles source codes to produce the API adapter unit 920 including the order accepting unit 921 and the wholesale service API execution unit 923.

Storage Unit of API Adapter Creation Apparatus

Next, the storage unit 120 of the API adapter creation apparatus 100 will be described. The storage unit 120 includes a wholesale service API specification database 210, the API execution order database 230, the API parameter database 250, an API adapter source code repository 270, and an API adapter execution file repository 280.

The wholesale service API specification database 210, the API execution order database 230, and the API parameter database 250 have already been described. The API adapter source code repository 270 is a repository of source codes of the API adapter and the adapter generation unit 119 stores generated source codes in the API adapter source code repository 270.

The API adapter execution file repository 280 is a repository of execution files of the API adapter, and the adapter generation unit 119 stores execution files of the API adapter generated by compiling in the API adapter execution file repository 280.

Setting Processing of Logic and Parameter

The processing of steps S102 and S103 in FIG. 3 will be described below with reference to the screens of the API adapter creation apparatus 100 illustrated in FIGS. 8 to 10, 12, 14, 15, 17, and 18, and the API execution order database 230 and the API parameter database 250 illustrated in FIGS. 6, 7, 11, 13, and 16. Specifically, details of logic and parameters defined (set) by a developing engineer and processing details of the API execution order setting unit 112, the API execution condition setting unit 113, the API iterative execution setting unit 114, the API request parameter acquisition source setting unit 115, the API response parameter reflection destination setting unit 116, and the API request/response parameter design support unit 117 will be described.

Execution Order Setting

Figure 8:
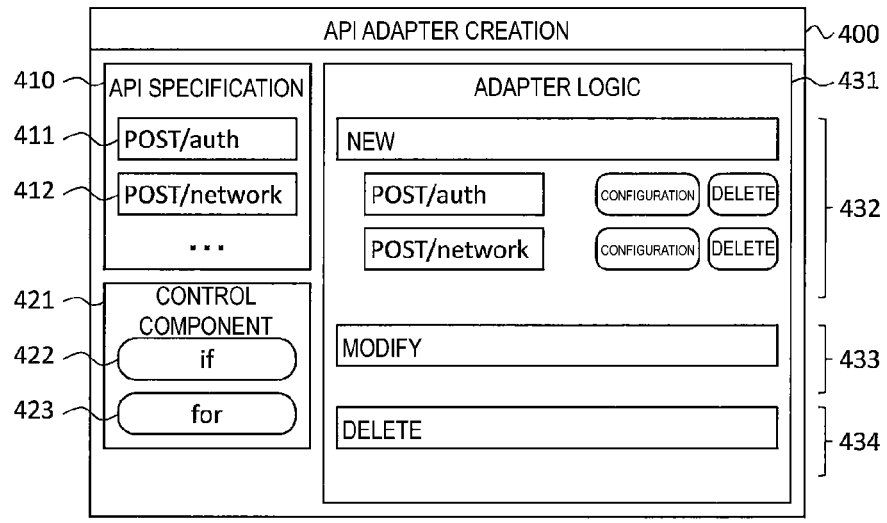
FIG. 8 is a diagram illustrating an execution order setting screen displayed by an API adapter creation apparatus according to the present embodiment.

FIG. 8 is a diagram illustrating an execution order setting screen 400 displayed by the API adapter creation apparatus 100 according to the present embodiment. A wholesale service API specification region 410 is displayed on the left upper side of the execution order setting screen 400. A list of API name icons 411 and 412 of the wholesale service API is displayed in the wholesale service API specification region 410. Note that the names displayed in the API name icons are one in which the method 212 is combined with the endpoint 213 of the API specifications 229 (see FIG. 5) of the wholesale services.

A control component region 421 including an "if" icon 422 and a "for" icon 423 is displayed on the left lower side of the execution order setting screen 400.

An adapter logic region 431 is displayed on the right side of the execution order setting screen 400, The adapter logic region 431 is divided into a new adapter logic region 432, a modification adapter logic region 433, and a deletion adapter logic region 434. Operations of a developing engineer in the new adapter logic region 432, the modification adapter logic region 433, and the deletion adapter logic region 434 and reflection of the execution order that is the result of the operations in the API execution order database 230 (see FIG. 6) are similar regardless of the regions, except for the types 232 and 252. Hereinafter, the new adapter logic region 432 will be described.

The developing engineer may drag the API name icons 411 and 412 provided in the wholesale service API specification region 410 and drop them into the new adapter logic region 432 to define an invocation order (execution order) of the wholesale service API. In FIG. 8, an execution order of "POST/auth" and "POST/network" is defined in this order.

The API execution order setting unit 112 stores the execution order defined in the new adapter logic region 432 in the API execution order database 230 as the records 241 and 242 in FIG. 6. Note that, the name of the adapter API is assumed to be "XXX" here. In the following description, the name of the adapter API is assumed to be "YYY."

When a developing engineer clicks the "delete" button on the right side of the API name icon in the new adapter logic region 432, the API execution order setting unit 112 deletes the API name icon and deletes the record corresponding to that in the API execution order database 230.

Request Parameter Setting

Figure 9:
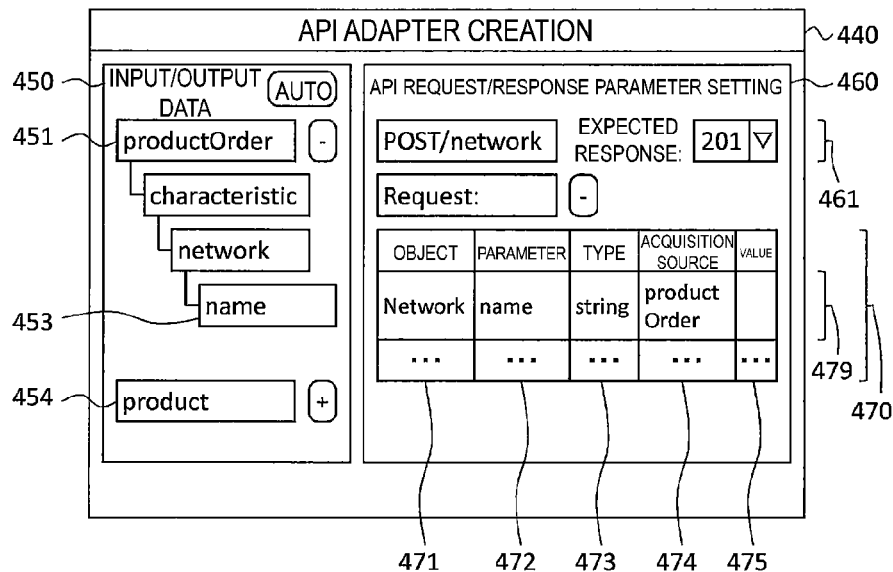
FIG. 9 is a diagram illustrating a parameter setting screen displayed by the API adapter creation apparatus according to the present embodiment.

FIG. 9 is a diagram illustrating a parameter setting screen 440 displayed by the API adapter creation apparatus 100 according to the present embodiment. When a developing engineer clicks the "settings" button on the right side of the API name icon "POST/network" in the new adapter logic region 432 of the execution order setting screen 400 (see FIG. 8), the API adapter creation apparatus 100 displays the parameter setting screen 440.

An input/output data region 450 is displayed on the left side of the parameter setting screen 440, The input/output data region 450 is a region in which data included in a request parameter and a response parameter of the adapter API is displayed including the tree structure. The developing engineer defines the request parameter or the response parameter of the adapter API while editing or referring to the input/output data region 450.

An API request/response parameter setting region 460 is displayed on the right side of the parameter setting screen 440. An upper region 461 of the API request/response parameter setting region 460 displays the name icon of the wholesale service API for parameter setting ("POST/network" in FIG. 5) and an expected response (labeled as "201" in FIG. 5).

A request parameter setting table 470 is displayed below the upper region 461. The request parameter setting table 470 is tabular data, in which one row (record) indicates one request parameter, and includes columns (attributes) of object 471, parameter 472, type 473, acquisition source 474, and value 475. The API request parameter acquisition source setting unit 115 displays the object 471, the parameters 472, and the type 473 with reference to the request parameters 214 of the wholesale service API specification database 210 (see FIG. 5).

When the developing engineer specifies a request parameters of the adapter API displayed in the input/output data region 450, which is an acquisition source of the request parameters of the wholesale service API in the request parameter setting table 470, the API request parameter acquisition source setting unit 115 displays a parameter serving as an acquisition source in the acquisition source 474. For example, if the development engineer specifies that the acquisition source of the parameter "name" indicated in the record 479 is a parameter 453 "name" displayed in the input/output data region 450, the API request parameter acquisition source setting unit 115 displays a parameter 451 "productOrder" including the parameter 453 "name" in the acquisition source 474. Furthermore, the API request parameter acquisition source setting unit 115 reflects this specification (setting) in the API parameter database 250 (see the record 262 in FIG. 7).

Note that the name of the wholesale service API on the parameter setting screen 440 is the name in which the method 212 is combined with the endpoint 213 of the API specifications 229 (see FIG. 5) of the wholesale service, like the "POST/network" on the name icon. On the other hand, the name of the wholesale service API in the API parameter database 250 (see FIG. 7) is the API name 211 of the API specifications 229 of the wholesale service included in the processing 253.

The developing engineer can specify the value of the request parameter, without specifying the acquisition source of the request parameter. At this time, the value is specified in the value 475.

Response Parameter Setting

Figures 10, 11:
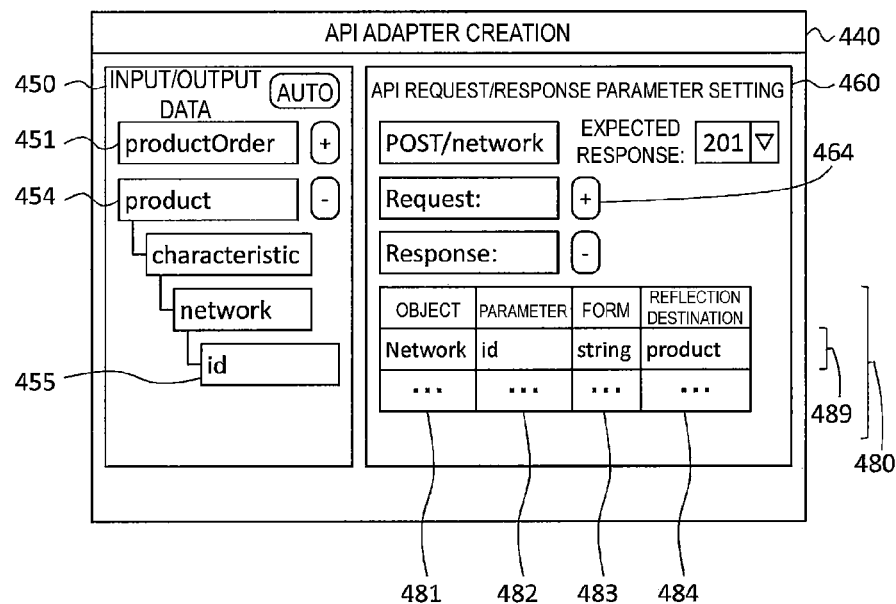
FIG. 10 is a diagram illustrating a parameter setting screen for response parameters displayed by the API adapter creation apparatus according to the present embodiment.
FIG. 11 is a diagram for describing a record included in an API parameter database according to the present embodiment.

FIG. 10 is a diagram illustrating the parameter setting screen 440 for response parameters displayed by the API adapter creation apparatus 100 according to the present embodiment. In FIG. 10, the request parameter setting table 470 is folded and thus is not displayed. When a toggle button 464 is clicked, it is expanded and the request parameter setting table 470 (see FIG. 9) is displayed. At this time, when the toggle button 464 is labeled with "-" and if it is clicked again, the request parameter setting table 470 is folded and thus is not displayed.

In the input/output data region 450 on the left side of the parameter setting screen 440, the parameter 451 "productOrder" is folded and displayed and the parameter 454 "product" is expanded and displayed.

The response parameter setting table 480 is tabular data, in which one row (record) indicates one response parameter and includes columns (attributes) of object 481, parameter 482, type 483, and reflection destination 484. The API response parameter reflection destination setting unit 116 displays the object 481, the parameter 482, and the type 483 with reference to the response parameters 219 of the wholesale service API specification database 210 (see FIG. 5).

When the developing engineer specifies a response parameter of the adapter API displayed in the input/output data region 450, which is the reflection destination of the response parameters of the wholesale service API in the response parameter setting table 480, the API response parameter reflection destination setting unit 116 displays the parameters of the reflection destination in the reflection destination 484. For example, if the developing engineer specifies that the reflection destination of the parameter "id" indicated in the record 489 is a parameter 455 "id" displayed in the input/output data region 450, the API response parameter reflection destination setting unit 116 displays a parameter 454 "product" including the parameter 455 "id" in the reflection destination 484. Furthermore, the API response parameter reflection destination setting unit 116 reflects this specification (setting) in the API parameter database 250 (see the record 264 in FIG. 11, which will be described below).

FIG. 11 is a diagram for describing the record 264 included in the API parameter database 250 according to the present embodiment. The record 264 indicates that, in invocation of the wholesale service API of "postNetwork" having the execution order of "4" (see the record 246 of FIG. 6), a reflection destination of the parameter 256 "id" having the object 255 of the response parameter "Network" is "product.characteristic.network.id" of the adapter API.

Automatic Parameter Setting

As described in FIGS. 9 and 10, the developing engineer can specify, on the screen of the API adapter creation apparatus 100, the acquisition source of the request parameters and the reflection destination of the response parameters of the wholesale service API. In a case in which the name of the request parameter of the wholesale service API matches the name of the request parameter of the adapter API that is an acquisition source, or a case in which the name of the response parameter of the wholesale service API matches the name of the response parameter of the adapter API that is a reflection destination, the acquisition source and the reflection destination can be set without being specified by the developing engineer.

Figures 12, 13:
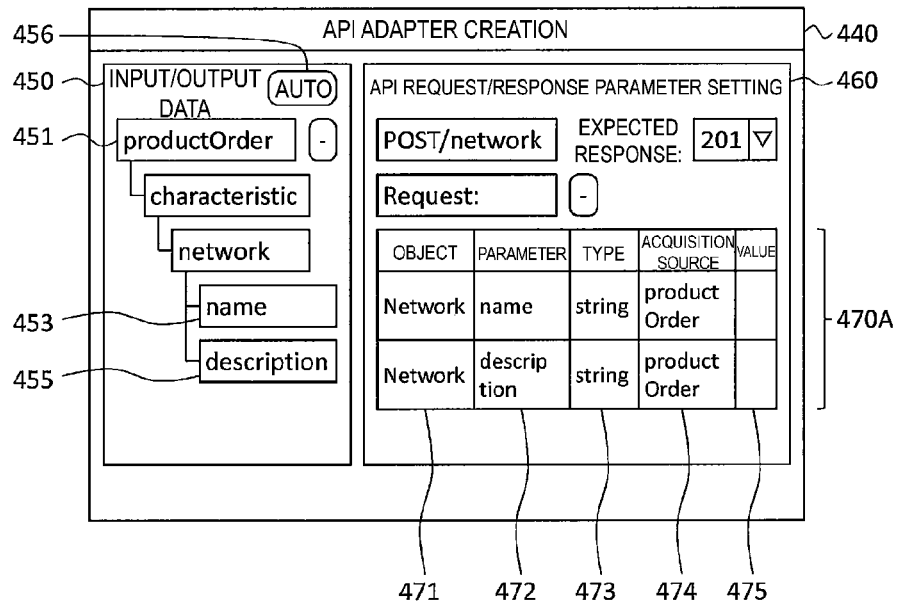
FIG. 12 is a diagram illustrating a parameter setting screen of a request parameter displayed by the API adapter creation apparatus according to the present embodiment.
FIG. 13 is a diagram illustrating records included in an API parameter database according to the present embodiment.

FIG. 12 is a diagram illustrating the parameter setting screen 440 for request parameters displayed by the API adapter creation apparatus 100 according to the present embodiment. A parameter "name" and a parameter "description" are displayed in a request parameter setting table 470A. When a developing engineer specifies the parameter "name," the parameter "description," and a parameter 451 "productOrder" and clicks an "auto" button 456, the API request/response parameter design support unit 117 finds parameters that are below the parameter 451 "productOrder" and parameters whose names match the parameters included in the request parameter setting table 470A, sets the acquisition source 474, and reflects them in the API parameter database 250 (see records 262 and 265 in FIG. 13, which will be described below).

If the object 471 "Network" is not defined below the parameter 451 "productOrder" which is a request parameter for the adapter API, the API request/response parameter design support unit 117 defines "productOrder.characteristic.network" which is a parameter of the object 471 type "Network"directly below "productORder.characteristic," sets it as an acquisition source, and reflects it in the API parameter database 250.

The API request/response parameter design support unit 117 likewise sets the reflection destination for the response parameters and reflects it in the API parameter database 250.

FIG. 13 is a diagram for describing the records 262 and 265 included in the API parameter database 250 according to the present embodiment. The record 262 has been described in FIG. 7. The record 265 indicates that, in invocation of the wholesale service API of "postNetwork" having the execution order of "4" (see the record 246 of FIG. 6), an acquisition source of the parameter 256 "description" having the object 255 of the request parameter "Network" is "productOrder.characteristic.network.description"of the adapter API.

Conditional Execution Setting

Figure 14:
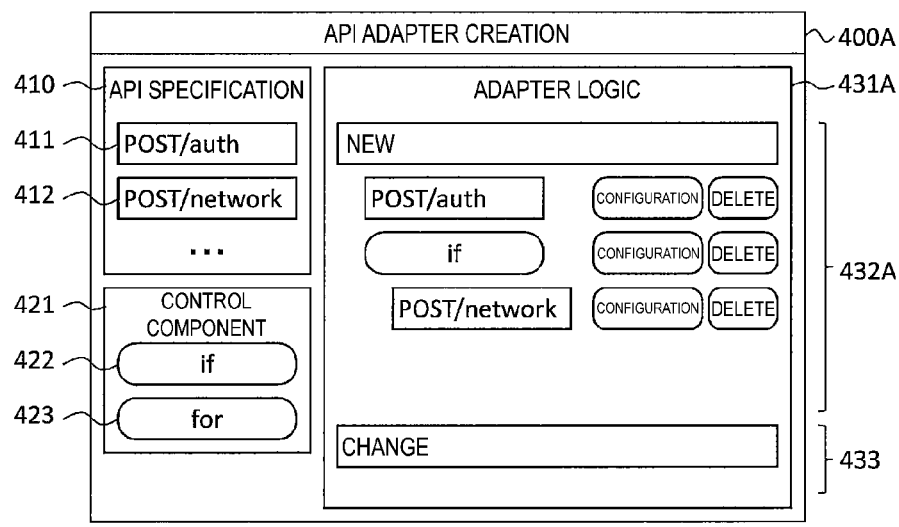
FIG. 14 is a diagram illustrating an execution order setting screen displayed by the API adapter creation apparatus according to the present embodiment.

FIG. 14 is a diagram illustrating an execution order setting screen 400A displayed by the API adapter creation apparatus 100 according to the present embodiment. Processing for defining conditional execution will be described with reference to FIG. 14.

In the new adapter logic region 432 illustrated in FIG. 8, invoking the wholesale service API is defined in the order of "POST/auth," and "POST/network." If "POST/network" is invoked (executed) conditionally, the developing engineer drags the icon 422 "if" and drops it between "POST/auth" and "POST/network" displayed in the new adapter logic region 432. The API execution condition setting unit 113 detects this drop and moves and displays the API name icon "POST/network"one step to the right side to be displayed in the new adapter logic region 432A of FIG. 14 to indicate conditional execution of "POST/network." When the developing engineer clicks the "settings" button on the right side of the icon "if" in the new adapter logic region 432A, the screen transitions to an execution condition setting screen 491 (see FIG. 15, which will be described below) to define execution conditions.

Figure 15:
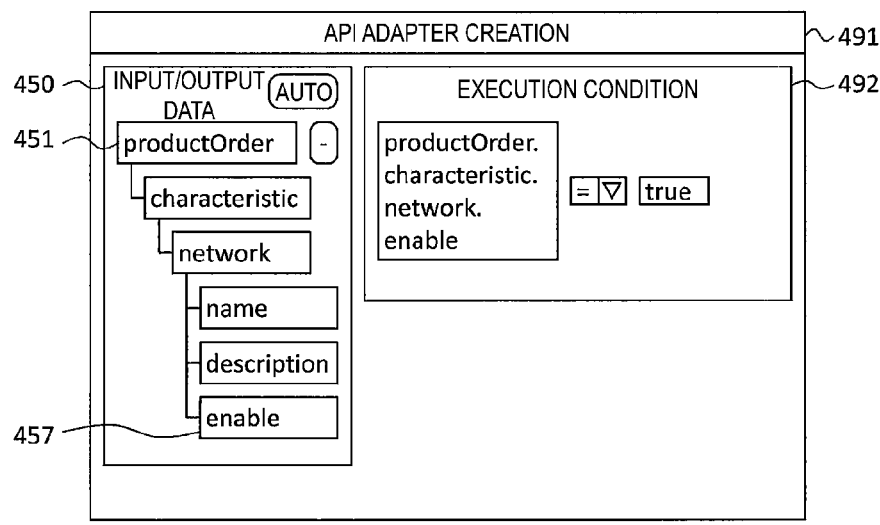
FIG. 15 is a diagram illustrating an execution condition setting screen displayed by the API adapter creation apparatus according to the present embodiment.

FIG. 15 is a diagram illustrating the execution condition setting screen 491 displayed by the API adapter creation apparatus 100 according to the present embodiment. The input/output data region 450 is displayed on the right side of the execution condition setting screen 491, and an execution condition setting region 492 is displayed on the left side. The developing engineer combines parameters and constants (e.g., false values, numerical values, and character strings), comparison operators, numerical operators, functions, and the like present in the input/output data region 450 with each other, and defines formulas that are execution conditions in the execution condition setting region 492. In FIG. 15, it is defined that a value of the parameter "productOrder.characteristic.network.enable" is true as an execution condition.

Figures 16, 17:
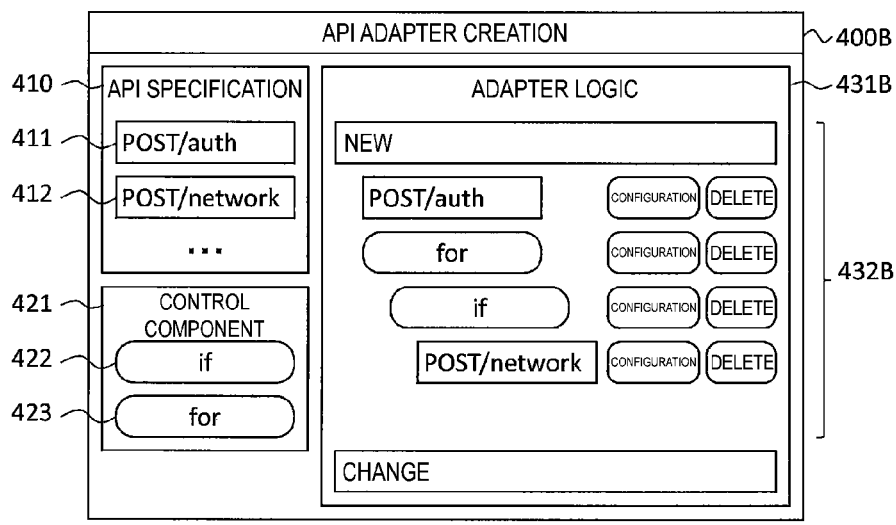
FIG. 16 is a diagram for describing records of an API parameter database according to the present embodiment.
FIG. 17 is a diagram illustrating an execution order setting screen displayed by the API adapter creation apparatus according to the present embodiment.

FIG. 16 is a diagram for describing records of the API parameter database 250 according to the present embodiment. At the time point at which the developing engineer has defined the logic of the adapter API illustrated in FIGS. 14 and 15, records 271 to 274 are stored in the API execution order database 230. In the new adapter logic region 432A, processing is defined in order of "POST/auth," "if," and "POST/network," and they correspond to the records 271 to 273, respectively. Record 274 indicates an end of conditional execution shown in the record 272. A formula for an execution condition defined in the execution condition setting region 492 (see FIG. 15) is store in 236 in the additional information of the record 272.

Iterative Execution Setting

FIG. 17 is a diagram illustrating an execution order setting screen 400B displayed by the API adapter creation apparatus 100 according to the present embodiment. Processing for defining iterative execution will be described with reference to FIG. 17.

In the new adapter logic region 432A illustrated in FIG. 14, invoking the wholesale service API is defined in the order of "POST/auth" and "POST/network" of conditional execution. When "POST/network" of conditional execution is to be repeatedly performed, the developing engineer drags the icon 423 "for" and drops it between "POST/auth"and "if" displayed in the new adapter logic region 432A. The API iterative execution setting unit 114 detects this drop and moves and displays the icon "if" and the API name icon "POST/network"one step to the right side to be displayed in the new adapter logic region 432B of FIG. 17 to indicate that conditional execution of "POST/network" will be iteratively executed. When the developing engineer clicks the "settings" button on the right side of the icon "for" in the new adapter logic region 432B, the screen transitions to an iteration condition setting screen 495 (see FIG. 18, which will be described below) to define an iteration condition.

Figure 18:
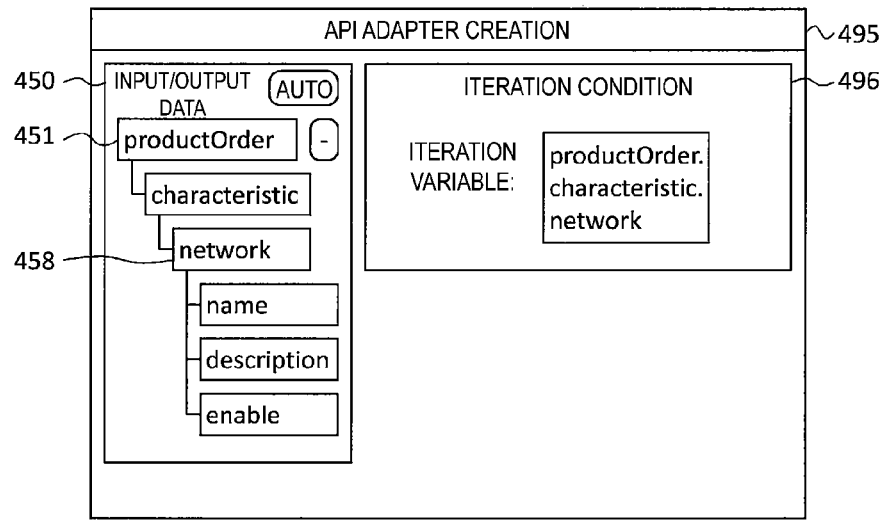
FIG. 18 is a diagram illustrating an iteration condition setting screen displayed by the API adapter creation apparatus according to the present embodiment.

FIG. 18 is a diagram illustrating the iteration condition setting screen 495 displayed by the API adapter creation apparatus 100 according to the present embodiment. The input/output data region 450 is displayed on the left side of the execution condition setting screen 491, and an iteration condition setting region 496 is displayed on the right side. The developing engineer sets an iteration condition in the iteration condition setting region 496 by defining a parameter in the input/output data region 450 as an iteration variable. In FIG. 18, the parameter "productOrder.characteristic.network" is defined as an iteration variable. This parameter is a sequence and defines to repeat processing for each element of the sequence.

Once the developing engineer defines the logic of the adapter API shown in FIGS. 17, 15 and 18, the API execution order database 230 stores records 243 to 248 (see FIG. 6). In the new adapter logic region 432B (see FIG. 17), processing is defined in order of "POST/auth," "for," "if," and "POST/network," and they correspond to the records 243 to 246, respectively.

The record 248 indicates an end of iterative execution shown in the record 244. 236 in the additional information of the record 244 stores an iteration variable defined in the iteration condition setting region 496 (see FIG. 18).

Record 247 indicates an end of conditional execution shown in the record 245. The additional information 236 in the record 245 stores a formula for an execution condition defined in the execution condition setting region 492 (see FIG. 15).

Source Code Generation Process

Figure 19:
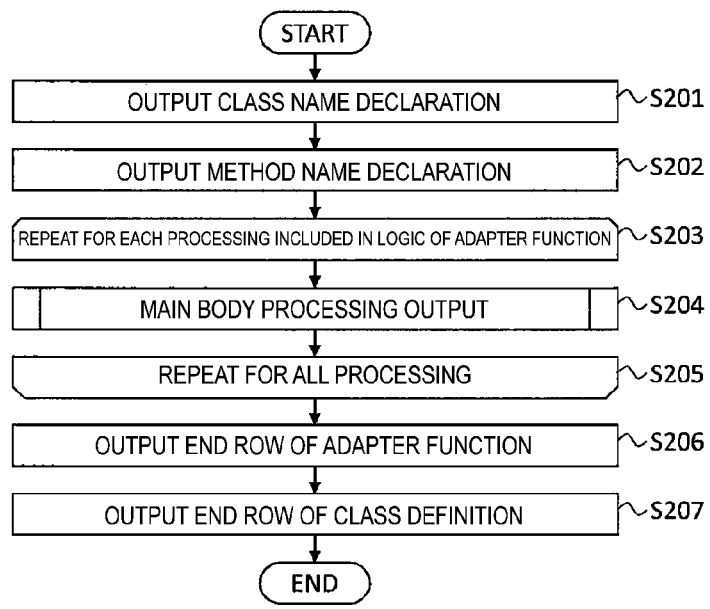
FIG. 19 is a flowchart showing a source code generation process performed by a source code generation unit according to the present embodiment.
Figure 20:
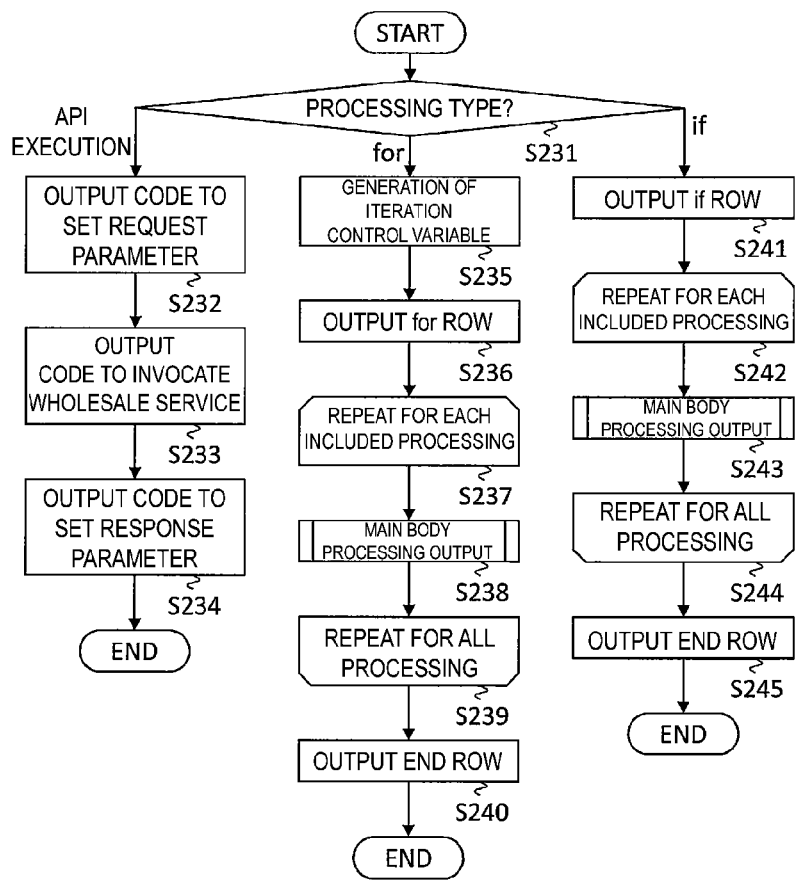
FIG. 20 is a flowchart showing a main body processing output process performed by the source code generation unit according to the present embodiment.

FIG. 19 is a flowchart showing a source code generation process performed by the source code generation unit 118 according to the present embodiment. FIG. 20 is a flowchart showing a main body processing output process performed by the source code generation unit 118 according to the present embodiment. The main body output process refers to the process of step S204 in FIG. 19. FIG. 21 is a source code 290 generated by the source code generation unit 118 according to the present embodiment. Process of outputting the logic of the adapter API shown in the records 243 to 248 of the API execution order database 230 as the source code 290 will be described with reference to FIGS. 19 to 21. Note that the source code generation process is a process executed in step S104 (see FIG. 3).

Before the source code generation process is described, an overview of the source code 290 of the adapter API to be generated will be described. The adapter API is defined as a method of a class of object-oriented languages.

Row 1 is a class name declaration, and the rows from Row 1 describe a class definition (class description). Row 28 is the end row of the class definition. The class name includes adapter API name (see the API 231 in FIG. 6) and type (see the type 232 of FIG. 6).

Row 3 is a method name declaration of a method that is an adapter API, and the rows from Row 3 are a method definition. Row 27 is the end row of the method definition. The definition of the method described below (Row 5 to Row 26) is the logic of the adapter API, and the processing stored in the records 243 to 248 (see FIG. 6) is output as the source code.

Row 9 is invocation of "postAuth" of the wholesale service API. Rows 5 through 7 are codes for generating a request parameter for "postAuth" prior to the invocation of "postAuth," which sets a value of the request parameter (acquisition source) of the adapter API to the request parameter of "postAuth." Rows 11 and 12 are codes for setting the response parameters of "postAuth" to the response parameter (reflection destination) of the adapter API.

Row 14 is the beginning of a for sentence including an iteration condition, and row 26 is the end of the for sentence. Row 15 is the beginning of an if sentence including an execution condition, and row 25 is the end of the if sentence. Rows 16 to 24 are processing included in the if sentence and include invocation of "postNetwork" of the wholesale service API of the row 21, processing of the request parameters for the rows 16 to 19, and processing of response parameters of the rows 23 to 24.

In step S201 of FIG. 19, the source code generation unit 118 outputs a class name declaration row indicated in the row 1 of the source code 290. "Add" of the class name "AddYYYProcess" included in the class name declaration row indicates that the adapter API is new (the type 232 of FIG. 6 is "A"). "YYY" is the name of the adapter API (see the API 231 of FIG. 6).

In step S202, the source code generation unit 118 outputs a method name declaration row indicated in the row 3 of the source code 290. "interactWithPartner" of the method name is a fixed name.

In step S203, the source code generation unit 118 repeats the main body processing output of step S204 for each processing included in the logic of the adapter function. The processing included in the logic in the records 243 to 248 is the processing indicated in the records 243 and 244. Because the processing indicated in the records 245 to 247 is the processing included in iterative processing of "for" indicated in the record 244, it is not subjected to the iterative processing of step S203. Also, processing of the record 248 is the end of the iterative processing of the record 244 and it is performed as part of the main body output processing for the record 244.

The main body processing output of step S204 will be described in FIG. 20, which will be described below.

In step S205, the source code generation unit 118 determines whether step S204 has been performed for all types of processing included in the logic of the adapter function. If step S204 has been performed for all types of processing, the step proceeds to step S206, and if there is any remaining processing, step S204 is performed for the next processing. The rows 5 to 26 of the source code 290 are output in the processing of steps S203 to S205.

In step S206, the source code generation unit 118 outputs row 27 of the source code 290 that is the end row of the method definition.

In step S207, the source code generation unit 118 outputs row 28 of the source code 290 that is the end row of the class definition.

Source Code Generation Processing: Main Body Output Processing

Next, the main body output processing of the step S204 will be described in detail with reference to FIG. 20. The main body output processing invokes the main body output processing of its own in steps S238 and S243, and is recursive processing. Although, in the loop of steps S203 to S205 of FIG. 19, the main body output processing is performed two times, including "postAuth" corresponding to the record 243 and "for" corresponding to the record 244, self processing is invoked, and thus the main body output processing is performed more.

In step S231, the source code generation unit 118 proceeds to step S232 if the processing type 234 (see FIG. 6) is "API execution" (invocation of the wholesale service API) (step S231→API execution), proceeds to step S235 if the processing type 234 is "control" and the processing 235 is "for" (step S231→for), and proceeds to step S241 if the processing type 234 is "control" and the processing 235 is "if" (step S231→if).

In step S232, the source code generation unit 118 outputs a code to set the request parameters. In particular, the source code generation unit 118 refers to the record corresponding to the invoked wholesale service API included in the API parameter database 250 (see FIG. 7) to generate the source code to set the request parameters of the adapter API to the request parameters of the wholesale service API.

Hereinafter, a case in which the main body output processing for "postAuth" of the record 243 is invoked will be described as an example. The source code generation unit 118 searches the API parameters database 250 (see FIG. 7) for a record in which the processing 253 includes "postAuth" of the processing 235 of the record 243 and the execution order 233 of "1" and the parameter type 254 is "request." Next, the source code generation unit 118 outputs a code to generate the object 255 of the search result record and a code to set the input source/reflection destination 257 to the parameter 256 of the object 255 included in the search result record. In the case of "postAuth" of the record 243, a record 261 is retrieved to output the row 5 of source code 290 for generating the object and the row 6 for setting the parameters. The row 7 of the source code 290 is retrieved and output similarly to the record 261. If the code to generate the object has been output, no code to generate the object is output.

In step S233, the source code generation unit 118 outputs a code to invoke the wholesale service API. In the "postAuth" of the record 243, the source code generation unit 118 outputs the row 9 of the source code 290.

In step S234, the source code generation unit 118 outputs a code to set the response parameters. Specifically, the source code generation unit 118 refers to a record corresponding to an invoked wholesale service API included in the API parameter database 250 to generate a source code to set the response parameters of the wholesale service API to the response parameters of the adapter API.

Hereinafter, a case in which the main body output processing for "postAuth" of the record 243 is invoked will be described as an example. The source code generation unit 118 searches the API parameters database 250 (see FIG. 7) for a record in which the processing 253 includes "post- Auth" of the processing 235 of the record 243 and the execution order 233 of "1" and the parameter type 254 is "response." Next, the source code generation unit 118 outputs a code to acquire the object 255 of the search result record and a code to set the parameter 256 to a parameter of the input source/reflection destination 257. In the case of "postAuth" in the record 243, the record 263 is retrieved to output the row 11 of the source code to acquire AuthResponse of the object 255 and the row 12 to set the parameter 256 "apiToken" to the parameter of the input source/reflection destination 257 "internalData.apiToken."

In step S235, the source code generation unit 118 generates an iteration control variable. Specifically, the source code generation unit 118 generates an iteration variable included in the additional information 236.

Hereinafter, a case in which the main body output processing for "for" of the record 244 is invoked will be described as an example. The iteration variable in the additional information 236 of the record 244 is "productOrder.characteristic.network" and is a variable in the sequence. Thus, the source code generation unit 118 generates "i" which is an integer variable as a control variable representing an index of the sequence.

In step S236, the source code generation unit 118 outputs the for row. Specifically, the source code generation unit 118 outputs the generated control variable and the for row including the iteration variable in the additional information 236.

Hereinafter, a case in which the main body output processing for "for" of the record 244 is invoked will be described as an example. The source code generation unit 118 has an initial value of 0 for the control variable, and outputs the row 14 of the source code 290 indicating repetition to "productOrder.characteristic.networklength" which is the length of the sequence of the iteration variable "productOrder.characteristic.network" while increasing the control variable by one.

In steps S237 to 239, the source code generation unit 118 repeats the main body output processing of step S238 for each processing included in "for." The processing included in "for" of the record 244 is only processing of "if" in the record 245. The record 246 is the processing included in "if" in the record 245, and the record 247 is the end of "if" in the record 245. Thus, the source code generation unit 118 performs the main body output processing for the processing of the record 245. This processing will be described in detail in steps S241 to S245. Note that, in this processing, the rows 15 to 25 of the source code 290 are output. In step S240, the source code generation unit 118 outputs the end row. At "for" of the record 244, the row 26 of the source code 290 is output.

In step S241, the source code generation unit 118 outputs if rows that include execution conditions. Hereinafter, a case in which the main body output processing for "if" of the record 245 is invoked will be described as an example. The execution condition for "if" in the record 245 is "productOrder.characteristic.network.enable=true" indicated in the additional information 236, and the source code generation unit 118 outputs the row 15 of the source code 290 that includes this execution condition. Note that "productOrder.characteristic.network" included in the execution conditions is a sequence, and the row 15 is output including the control variable "i" output in the row 14.

In steps S242 to S244, the source code generation unit 118 repeats the main body output processing of step S243 for each processing included in "if" The processing included in "if" of the record 245 is only processing of "postNework" in the record 246. Thus, the source code generation unit 118 performs the main body output processing for the processing of the record 246. This processing is similar to "postAuth" as described in steps S232 to S234, and the rows 16 to 24 of source code 290 are output therein.

In step S245, the source code generation unit 118 outputs the end row. At "if" in the record 245, the row 25 of source code 290 is output.

Characteristic of API Adapter Creation Apparatus

A developing engineer may define an order, execution conditions, and iteration conditions of a wholesale service API to be invoked by an adapter API, and define the relationship between the request and response parameters of the adapter API and the request and response parameters of the wholesale service API, and thereby can develop the API adapter. The developing engineer does not need to describe the source codes and can focus on study of the logic, which reduces the time required for the development and thus can deal with new wholesale services and specification changes in a short period of time.

The above-described definitions of the execution orders and the parameter relationships are design information, and thus there is no need to create specifications that are the design information. Furthermore, when the design information or the source code is changed, the other factor does not need to be modified. Mismatch between the design information and implementation (source code) does not occur.

REFERENCE SIGNS LIST

100 API adapter creation apparatus
110 Controller
111 Wholesale service API specification reference unit
112 API execution order setting unit
113 API execution condition setting unit
114 API iterative execution setting unit
115 API request parameter acquisition source setting unit
116 API response parameter reflection destination setting unit
117 API request/response parameter design support unit
118 Source code generation unit
119 Adapter generation unit
120 Storage unit

The invention claimed is:

1. An Application Program Interface (API) adapter creation apparatus configured to create an adapter API provided by an API adapter of a plurality of wholesale services, the API adapter provided in a multi-service coordination execution apparatus configured to construct a coordinated service in which the wholesale services are combined, the API adapter creation apparatus comprising a central processing unit (CPU) configured to:
    accept a setting of an execution order of a wholesale service API indicating an API of the wholesale service invoked by internal processing of the adapter API;
    accept a setting of a request parameter of the adapter API serving as an acquisition source of a request parameter of the wholesale service API;
    accept a setting of a response parameter of the adapter API serving as a reflection destination of a response parameter of the wholesale service API; and
    generate a source code of the adapter API based on the setting of the execution order, the setting of the acquisition source, and the setting of the reflection destination.

2. The API adapter creation apparatus according to claim 1, wherein the CPU is further configured to:
   accept a setting of an execution condition for execution of the wholesale service API, and
   generate the source code of the adapter API including content of the setting of the execution condition.

3. The API adapter creation apparatus according to claim 1, wherein the CPU is further configured to:
   accept a setting of an iteration condition for iterative execution of the wholesale service API, and
   generate the source code of the adapter API including content of the setting of the iteration condition.

4. The API adapter creation apparatus according to claim 1, wherein the CPU is further configured to:
   set, when specification of the request parameter of the wholesale service API is accepted, the request parameter of the adapter API having an identical name to the request parameter as the acquisition source, and to set, when specification of the response parameter of the wholesale service API is accepted, the response parameter of the adapter API having an identical name to that of the response parameter as the reflection destination, and
   generate the source code of the adapter API that includes content of the setting of the acquisition source and the reflection destination.

5. An API adapter creation method of an API adapter creation apparatus configured to create an adapter API provided by an API adapter of a plurality of wholesale services, the API adapter provided in a multi-service coordination execution apparatus configured to construct a coordinated service in which the wholesale services are combined, the API adapter creation method comprising:
   accepting a setting of an execution order of a wholesale service API indicating an API of the wholesale service invoked by internal processing of the adapter API;
   accepting a setting of a request parameter of the adapter API serving as an acquisition source of a request parameter of the wholesale service API;
   accepting a setting of a response parameter of the adapter API serving as a reflection destination of a response parameter of the wholesale service API; and
   generating a source code of the adapter API based on the setting of the execution order, the setting of the acquisition source, and the setting of the reflection destination.

6. The API adapter creation method according to claim 5, further comprising:
   accepting a setting of an execution condition for execution of the wholesale service API,
   wherein generating the source code of the adapter API comprises generating the source code of the adapter API including content of the setting of the execution condition.

7. The API adapter creation method according to claim 5, further comprising:
   accepting a setting of an iteration condition for iterative execution of the wholesale service API,
   wherein generating the source code of the adapter API comprises generating the source code of the adapter API including content of the setting of the iteration condition.

8. The API adapter creation method according to claim 5, further comprising:
   setting, when specification of the request parameter of the wholesale service API is accepted, the request parameter of the adapter API having an identical name to the request parameter as the acquisition source, and to set, when specification of the response parameter of the wholesale service API is accepted, the response parameter of the adapter API having an identical name to the response parameter as the reflection destination,
   wherein generating the source code of the adapter API comprises generating the source code of the adapter API that includes content of the setting of the acquisition source and the reflection destination.

9. A non-transitory computer readable medium storing one or more instructions for causing a computer to function as an API adapter creation apparatus configured to create an adapter API provided by an API adapter of a plurality of wholesale services, the API adapter provided in a multi-service coordination execution apparatus configured to construct a coordinated service in which the wholesale services are combined, the one or more instructions causing the computer to execute:
   accepting a setting of an execution order of a wholesale service API indicating an API of the wholesale service invoked by internal processing of the adapter API;
   accepting a setting of a request parameter of the adapter API serving as an acquisition source of a request parameter of the wholesale service API;
   accepting a setting of a response parameter of the adapter API serving as a reflection destination of a response parameter of the wholesale service API; and
   generating a source code of the adapter API based on the setting of the execution order, the setting of the acquisition source, and the setting of the reflection destination.

10. The non-transitory computer readable medium according to claim 9, wherein the one or more instructions further cause the computer to execute:
    accepting a setting of an execution condition for execution of the wholesale service API,
    wherein generating the source code of the adapter API comprises generating the source code of the adapter API including content of the setting of the execution condition.

11. The non-transitory computer readable medium according to claim 9, the one or more instructions further cause the computer to execute:
    accepting a setting of an iteration condition for iterative execution of the wholesale service API,
    wherein generating the source code of the adapter API comprises generating the source code of the adapter API including content of the setting of the iteration condition.

12. The non-transitory computer readable medium according to claim 9, the one or more instructions further cause the computer to execute:
    setting, when specification of the request parameter of the wholesale service API is accepted, the request parameter of the adapter API having an identical name to the request parameter as the acquisition source, and to set, when specification of the response parameter of the wholesale service API is accepted, the response parameter of the adapter API having an identical name to the response parameter as the reflection destination,
    wherein generating the source code of the adapter API comprises generating the source code of the adapter API that includes content of the setting of the acquisition source and the reflection destination.

* * * * *